Patented Mar. 29, 1949

2,465,765

UNITED STATES PATENT OFFICE 2,465,765

PANTOYL-SULFANILAMIDE DERIVATIVES

Harold Urist and Gustav J. Martin, Philadelphia, Pa., assignors to The National Drug Company, Philadelphia, Pa., a corporation of Pennsylvania No Drawing. Application April 16, 1947, Serial No. 741,946

4 Claims. (Cl. 260—397.7)

Our invention relates to new chemotherapeutic agents and their preparation. More particularly, it relates to certain pantoyl-sulfanilamide derivatives and to a method of producing the same.

We have found that $N^1$-diacetylpantoyl-sulfanilamide and $N^1$-diacetylpantoyl-$N^4$-acetylsulfanilamide possess valuable pharmacological properties. They may be represented by the general formula:

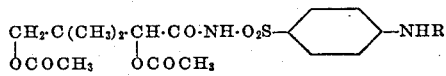

wherein R represents hydrogen or an acetyl group. In pure form they are white, crystalline solids.

These novel compounds appear to combine in a single molecule the capacities of a para-aminobenzoic acid displacing agent and of a pantothenic acid displacing agent. In the first capacity they are highly effective both in vivo and in vitro, possessing the same degree of activity as sulfanilamide and sulfathiazole. In their latter capacity they are as powerful as pantoyltaurine. They are highly effective anti-bacterial agents no matter how they are administered, be it orally, intravenously or otherwise. Particularly noteworthy is their effectiveness as a topical sulfonamide. When used in this manner, they may be incorporated in an ointment, dusted on or applied in any other manner. Dosage requirements are comparable to those of the sulfonamides.

A great advantage of our new chemotherapeutic agents is that they will effectively suppress or destroy microorganisms resistant to sulfa drugs, because they act not only as a sulfonamide, but also as a pantothenic acid displacer. Conversely, microorganisms resistant to pantothenic acid displacers are susceptible to our materials, because they also act as sulfonamides.

The $N^1$-diacetylpantoyl-$N^4$-acetylsulfanilamide was prepared by condensing acetylsulfanilamide with diacetylpantoyl chloride. This condensation reaction is preferably performed by mixing the reactants at somewhat elevated temperatures, for example on a steam bath, in the presence of an organic base, such as anhydrous pyridine, and then allowing the reaction mixture to stand overnight at room temperature. The desired products may be isolated by concentrating the reaction mixture in vacuo, taking up the residue in an organic solvent such as ethyl acetate, washing the resultant solution several times with a dilute, aqueous mineral acid and then with water until it is practically neutral, and thereafter evaporating off the solvent and drying the residual product in vacuo.

The $N^1$-diacetylpantoyl-sulfanilamide may also be prepared by condensing para-nitrobenzene-sulfonamide with diacetylpantoyl chloride in the same manner as described above, and then reducing the nitrogroup of the resultant $N^1$-diacetylpantoyl-para-nitrobenzene-sulfonamide to the amino group by hydrogenating the latter in an alcoholic solution in the presence of a hydrogenation catalyst, such as nickel, platinum or palladium.

The preparation of our new compounds may be illustrated by the following examples. It should be understood that our invention is not limited to the details given therein, as the reaction conditions may be varied widely.

Example I

Diacetylpantoyl chloride may be prepared by the following series of steps:

1. Pantoyl lactone is converted to pantamide by treatment with liquid ammonia according to the process described by Parke and Lawson in the Journal of the American Chemical Society, vol. 63 (1941), page 2870.

2. The hydroxy groups of the pantamide are acetylated forming diacetyl pantamide by treatment with acetic anhydride.

3. The diacetyl pantamide is converted to diacetylpantoic acid by treatment with amyl nitrite.

4. Finally, the diacetylpantoyl chloride is formed from the diacetylpantoic acid by treating the latter with thionyl chloride.

The last three steps are disclosed in an article by Harris, Boyack and Folkers in the Journal of the American Chemical Society, vol. 63 (1940) on page 2666.

Acetylsulfanilamide may be prepared by adding 60 c. c. of acetic anhydride to 100 grams of sulfanilamide. The reaction mixture heats up by itself and upon cooling and separating the solid, 110 grams of the desired product melting at 213–215° C. are obtained.

21.4 grams (0.1 mole) of the acetylsulfanilamide are dissolved in 50 c. c. of anhydrous pyridine and the solution kept on a steam bath. To this solution there are then added slowly while stirring over a period of 15 minutes 25.0 grams (0.1 mole) of the diacetylpantoyl chloride prepared as described above. The stirring and heating (on the steam bath) are continued for a further period of 30 minutes, whereupon the reaction mixture is allowed to stand overnight at room temperature.

The reaction mixture is then concentrated in vacuo to remove the bulk of the pyridine, and the residue is taken up in ethyl acetate. The resultant solution is washed three times with 10% hydrochloric acid and then with water until it is practically neutral. Thereafter, it is concentrated in vacuo to remove the ethyl acetate, finally drying the product under a vacuum of 0.3 mm. mercury column (using an oil pump) for 5 to 6 hours, while heating on a water bath at 60° C. Thus there are obtained 16.8 grams of $N^1$-diacetylpantoyl-$N^4$-acetylsulfanilamide, which corresponds to 39% of the theoretical yield. The product so obtained was in the form of a brown, resinous solid which upon analysis was found to contain 7.15% of sulfur (theoretical content 7.46%). Recrystallization of said product from 50% glacial acetic acid yields a white crystalline solid.

*Example II*

20.2 grams (0.1 mole) of para-nitrobenzene-sulfonamide are dissolved in 50 c. c. of anhydrous pyridine kept on a steam bath. To this solution there are then slowly added while stirring over a period of 15 minutes 25.0 grams (0.1 mole) of diacetylpantoyl chloride. The stirring and heating are continued for 30 minutes, after which the reaction mixture is allowed to stand at room temperature overnight. Thereafter, the reaction mixture is concentrated in vacuo, taken up in ethyl acetate, and the ethyl acetate solution washed with 10% hydrochloric acid and with water as in Example I. Upon concentrating the solution in vacuo, 15.1 grams of $N^1$-diacetylpantoylpara-nitrobenzene-sulfonamide are obtained in the form of a brown oil.

The foregoing product is dissolved in 100 c. c. of anhydrous ethyl alcohol, some Raney nickel added, and it is reduced with hydrogen in a Parr hydrogenator at 60 pounds pressure. The theoretical amount of hydrogen to convert the nitro to an amino group is taken up in a few hours. The reaction mixture is then filtered, and the solvent distilled off in vacuo. The residue is dried under a vacuum of 0.3 mm. mercury column (produced with an oil pump) at a temperature of 40–50° C. within several hours. It consists of 13 grams of $N^1$-diacetylpantoyl-sulfanilamide in the form of a brown, resinous solid. When purified by recrystallization from 50% glacial acetic acid, it is a white crystalline solid.

We claim:
1. Chemotherapeutic agents comprising compounds of the general formula:

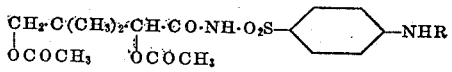

wherein R is selected from the group consisting of hydrogen and the acetyl group.
2. $N^1$-diacetylpantoyl-$N^4$-acetylsulfanilamide.
3. $N^1$-diacetylpantoyl-sulfanilamide.
4. A process for preparing $N^1$-diacetylpantoyl-sulfanilamide, which comprises first condensing para-nitrobenzene-sulfonamide with diacetylpantoyl chloride in the presence of an organic base, separating the condensation product from the reaction mixture, and then hydrogenating said product in an alcoholic solution in the presence of a hydrogenation catalyst.

HAROLD URIST.
GUSTAV J. MARTIN.

REFERENCES CITED

The following references are of record in the file of this patent:

FOREIGN PATENTS

| Number | Country | Date |
|---|---|---|
| 111,230 | Australia | Feb. 3, 1939 |

OTHER REFERENCES

Crossley et al., "Jour. Am. Chem. Soc.," vol. 61 (1939), pages 2950–2955.

Nielsen et al., "Chemical Abstracts," vol. 40 (1946), page 6128.